No. 881,444. PATENTED MAR. 10, 1908.
C. A. SCHLACHTER.
POWER TRANSMISSION DEVICE.
APPLICATION FILED JUNE 24, 1907.
3 SHEETS—SHEET 1.
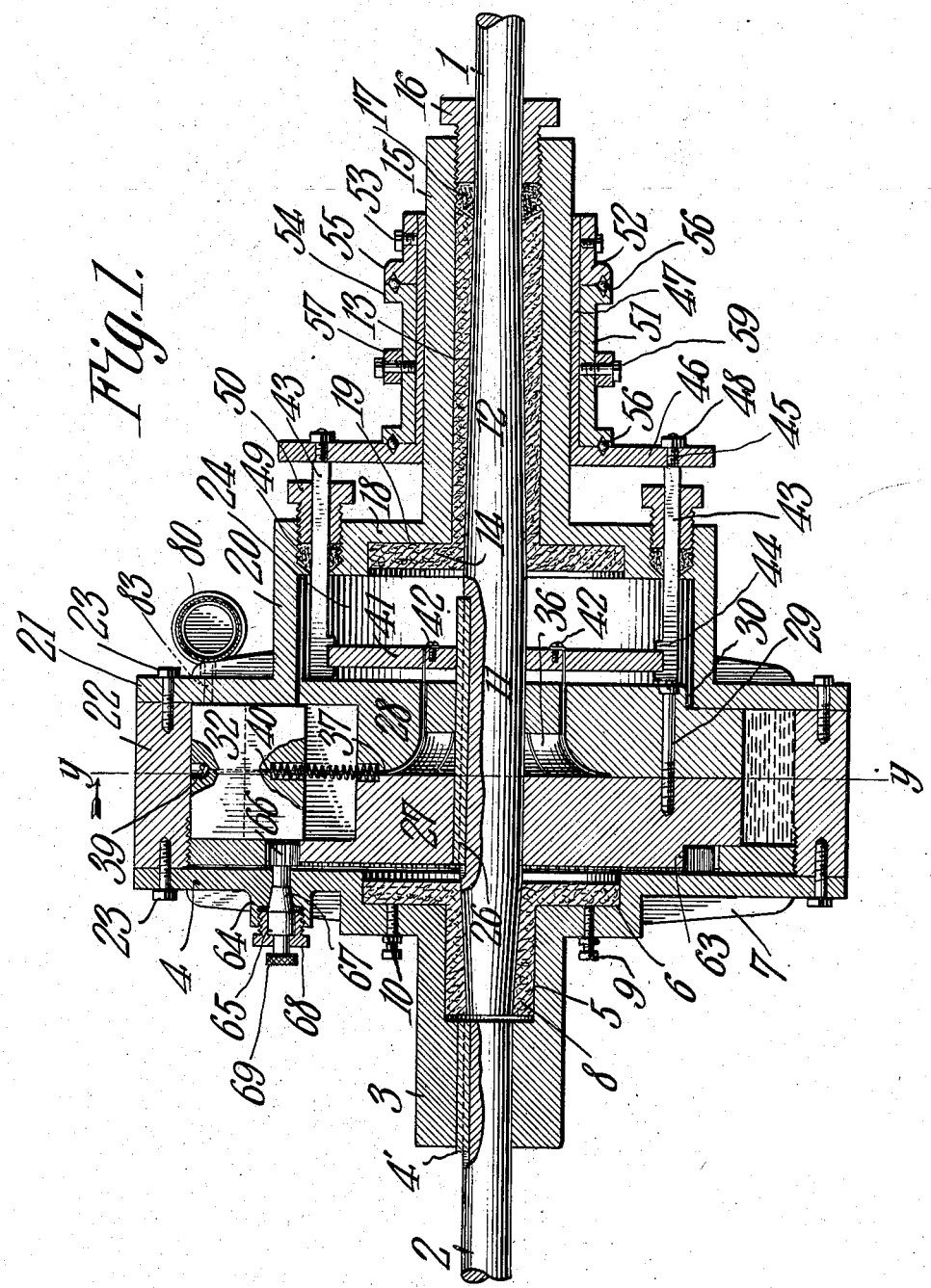
WITNESSES: Carl A. Schlachter, INVENTOR.
By C. A. Snow & Co.
ATTORNEYS

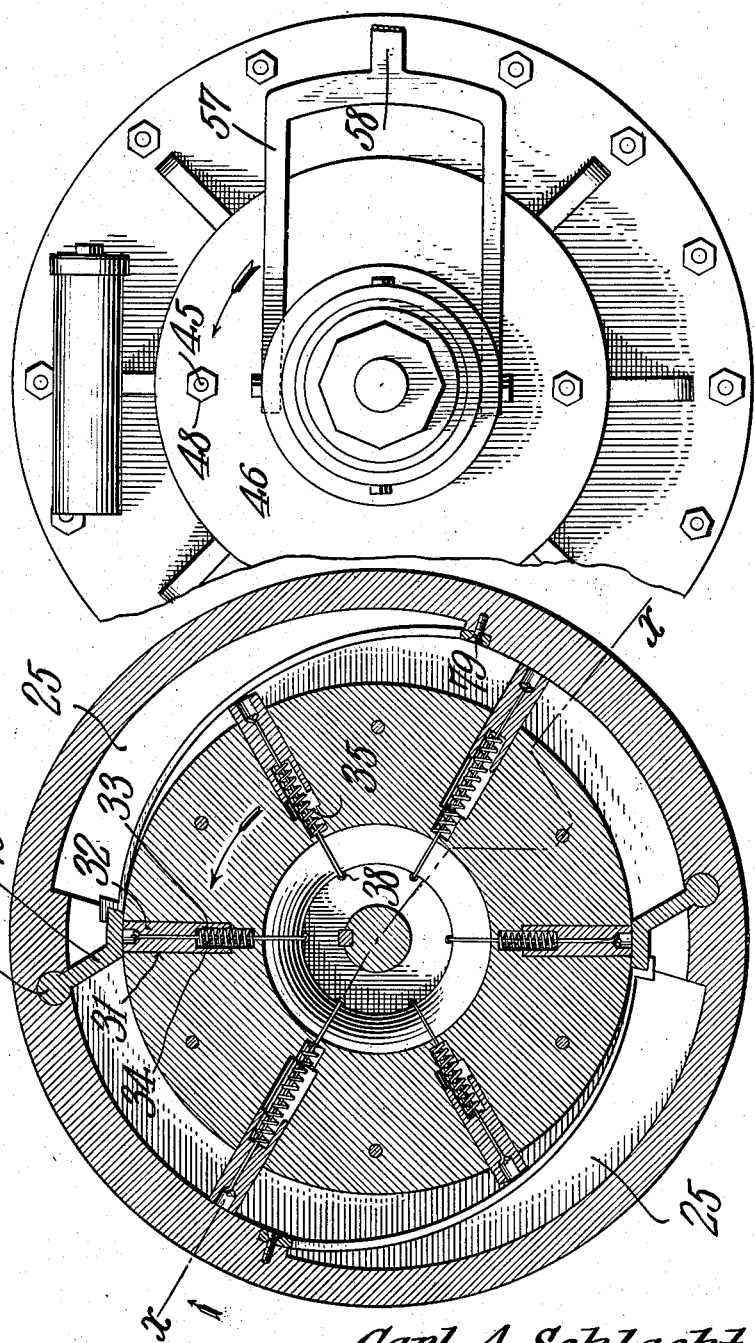

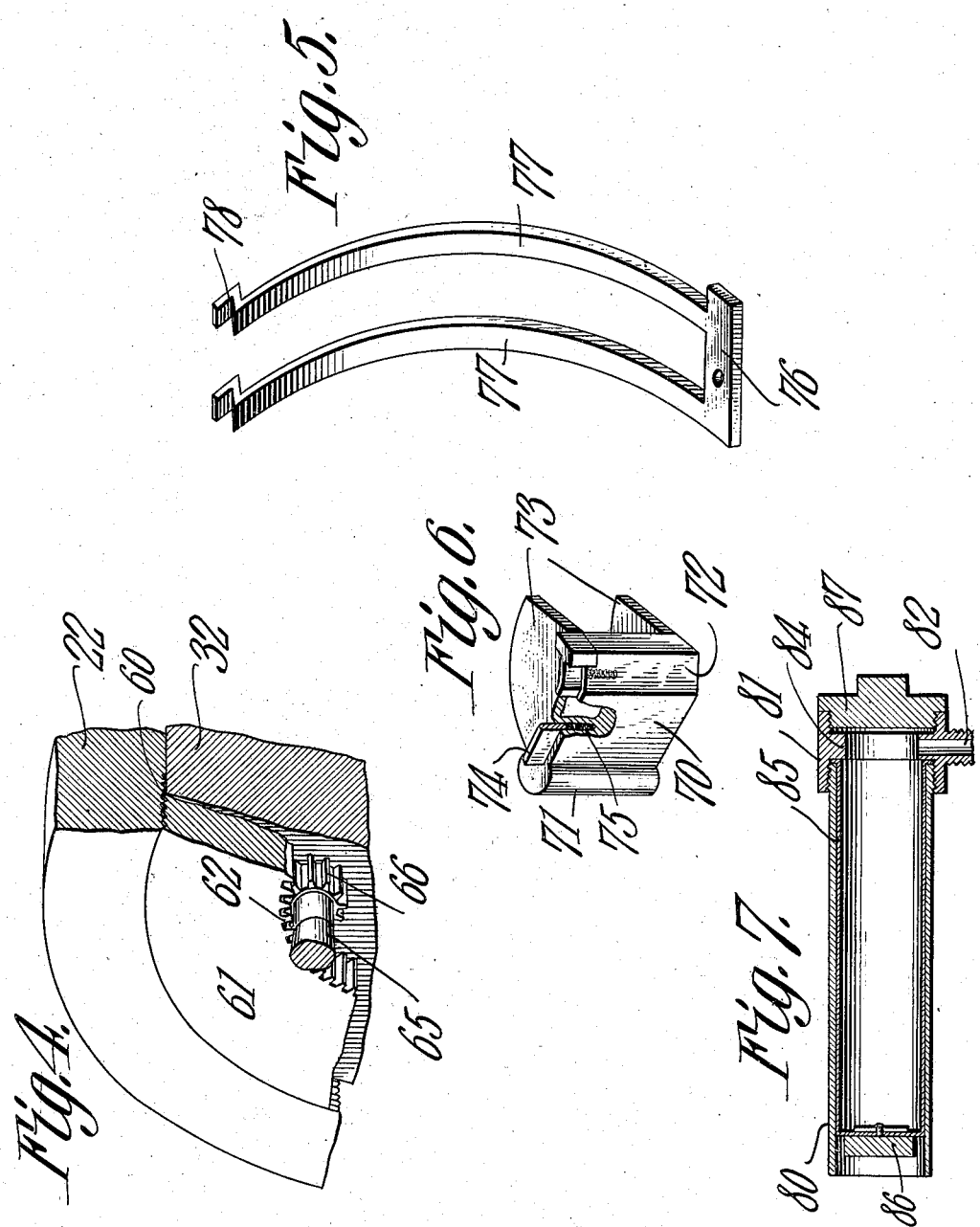

UNITED STATES PATENT OFFICE.

CARL A. SCHLACHTER, OF ROCKWELL CITY, IOWA.

POWER-TRANSMISSION DEVICE.

No. 881,444.　　Specification of Letters Patent.　　Patented March 10, 1908.

Application filed June 24, 1907. Serial No. 380,550.

*To all whom it may concern:*

Be it known that I, CARL A. SCHLACHTER, a citizen of the United States, residing at Rockwell City, in the county of Calhoun and State of Iowa, have invented a new and useful Power-Transmission Device, of which the following is a specfication.

This invention has reference to improvements in power transmission devices, and its object is to produce a means whereby the speed of a driven member may be varied at will without varying the speed of the drive member, through the intermediary of a fluid and certain throttling devices whereby the extent of the throttling of the flow of the fluid will determine the slip of the driven member relative to the drive member.

The invention comprises essentially a fluid chamber in which are rotated vanes or wings fast on the drive member, while the fluid chamber itself is fast on the driven member, so that the resistance offered to the rotation of the vanes or wings reacts upon the walls of the chamber and so causes the rotation of the driven member. Means are provided whereby the flow of the fluid may be entirely throttled, when it will act as a direct connection between the drive and driven members and the two members will rotate at the same speed. Or the fluid may be allowed to flow through adjustably constricted passages, which will permit the drive member to move correspondingly faster than the driven member, and, consequently, the speed of the driven member will be to such extent slower than the speed of the drive member.

The invention comprises special means for performing these various operations and adjustments, and also means whereby wear may be taken up so that there is practically no lost motion between the drive and driven members except that due to the escape of the fluid through the throttled passages.

The invention also comprises means for equalizing the pressure upon the fluid in such manner that there may be a certain elasticity of transmission to avoid shocks and jars to the structure.

The invention will be fully understood by reference to the following detailed description, taken in connection with the accompanying drawings forming part of this specification, in which,—

Figure 1 is a longitudinal section of the structure on the line x—x of Fig. 2, parts being shown in elevation; Fig. 2 is a cross section on the line y—y of Fig. 1; Fig. 3 is an end elevation at the right-hand end of the structure as viewed in Fig. 1; and Figs. 4, 5, 6 and 7 are detail views.

Referring to the drawings, there are shown two shafts 1 and 2. One of these shafts is the drive shaft and the other is the driven shaft but they may be interchangeably so arranged. In the following description the shaft 1 will be considered as the drive shaft and the shaft 2 will be considered as the driven shaft, with the understanding, however, that the contrary may be the case if so desired. The two shafts 1 and 2 are in alinement but are not connected other than in the manner hereinafter described.

Mounted upon the shaft 2 is a hub 3 secured to said shaft for rotation therewith by a key 4'. The hub 3 carries at one end a disk or cheek plate 4, and said hub has an axial recess 5. The cheek plate is also formed with an annular recess 6 about the hub, these recesses being formed in the cheek plate and in the hub on the side remote from the shaft 2 and which for convenience may be called the inner side of the cheek plate. The recess 6 is formed by stepping back the cheek plate, and beyond the stepped portion of this cheek plate it is provided with radial strengthening ribs 7 extending nearly to the periphery thereof. The shaft 1 extends into the hub 3 and is housed in the recess 5, and this end of the shaft 1 is tapered. Surrounding the shaft 1 within the recess 5 and also within the recess 6 are journal bearings 8 for the tapered end of the shaft 1. These bearings may be made of any suitable material, either metal, or, if need be, of fibrous material, and in order to take up any wear that may occur at this point there are set-screws 9 provided extending through the offset portion of the disk or cheek plate 4 and bearing against that portion of the boxing 8 seated in the recess 6. When the proper adjustment is obtained the set-screws 9 may be held in the adjusted position by jam nuts 10.

The shaft 1, for a distance back of its tapered end, is formed cylindrical, as shown at 11, and from this portion the shaft again tapers for a distance, as shown at 12. Surrounding the tapered portion 12 is another boxing 13 constituting one of the supports or bearings for the shaft, and this boxing 13 has on the end adjacent to the portion 11 of the shaft an annular flange 14. Surrounding the boxing 13 is a sleeve or hub 15 into one end of which is screwed a gland 16 engaging a packing gasket 17 and forcing the same against the corresponding end of the boxing 13. The hub or sleeve 15 is formed with an annular end flange 18 at the end remote from the gland 16, and this end flange is recessed, as shown at 19, to receive the annular flange 14 formed on the end of the boxing 13. The flange 18 is formed with a cylindrical overhang 20 terminating in an annular cheek plate 21, the outer periphery of which is coextensive with the outer periphery of the cheek plate 4, and between the two cheek plates 4 and 21 is a ring 22 to which both of these cheek plates are secured by screws or bolts 23. There is thus formed between the two cheek plates 4 and 21 a chamber extending from the shaft 1 to the interior of the ring 22, and within the cylindrical overhang 20 there is formed a side extension 24 of this chamber.

The inner periphery of the wall of the ring 22 is formed with two diametrically opposite recesses 25 (see Fig. 2), each embracing approximately one quarter of the circumferential extent of such inner periphery, but these recesses may be of greater or less extent.

Keyed upon the portion 11 of the shaft 1 by a suitable spline 26 is a drum composed of two members 27 and 28 joined by suitable screws 29, the drum being divided into two parts for convenience of construction. This drum is made of sufficient diameter to extend from the shaft portion 11 entirely across the chamber extension 24 and for a distance between the inner faces of the cheek plates 4 and 21, the section 28 of the drum being stepped or shouldered, as shown at 30, so as to partially enter the chamber 24.

Formed in the drum are a number of radial slots or recesses 31 of sufficient lateral extent to have one end wall coincident with the inner wall of the cheek plate 21 and the other end wall removed for a distance from the inner wall of the cheek plate 4, for a purpose which will presently appear. Within each radial slot 31 is seated a block 32 constituting a wing or vane. Each block 32 is provided at its inner end with a central perforation 33 for a spring 34, which latter is seated in a suitable socket 35 formed at the base of the corresponding slot 31.

The section 28 of the drum is formed with an interior recess 36 having curved, flaring walls, and the recess 36 is connected to each socket 35 by a suitable perforation or passage 37. Leading from the recess 36 to the exterior of the portion 28 of the block is an annular series of perforations 38. In the outer end of each vane 32 is formed another recess 39 to receive the knotted end of a cord or flexible strand 40 extending from the recess 39 through a suitable perforation in the vane 32 into and through the perforation 33 and also centrally through the spring 34. This cord passes through the socket 35 and into the recess 36, around the curved wall thereof, and out through the corresponding perforation 38. Exterior to the drum section 28 but within the chamber 24 there is a disk 41 mounted upon the shaft section 11 and keyed thereto by the spline 26, but this disk is movable to and from the drum section 28 upon the portion 11 of the shaft 1 for a distance within the chamber 24.

There is a cord 40 for each vane and each one of these cords 40 passes through and is secured to the disk 41 by a screw 42.

The springs 34 tend to force the vanes 32 radially outward until they are in engagement with the inner peripheral wall of the ring 22, but the extent of this outward movement of the vanes under the action of the springs 34 is controlled by the cords 40 connected to the disk 41. When this disk 41 is moved toward the drum the vanes are forced radially outward by the springs 34, but when the disk 41 is moved away from the drum the cords 40 pull the vanes into their seats to a corresponding extent, and though these vanes may be forced still further into their seats by other means to be described, they will move radially outward under the action of the springs 34 only to the extent permitted by the cords 40.

Now, in order that the disk 41 may be moved to and fro on the shaft section 11 there are provided two diametrically disposed bars 43 formed with engaging fingers 44 on one end to embrace the edge of the disk 41, and these bars extend through perforations in the flange 18 and are formed at their ends beyond the flange 18 with bolt extensions 45 passing through the corresponding portion of an annular flange 46 on the end of a sleeve 47 movable longitudinally on the exterior of the hub 15. The bolt extensions 45 of the arms 43 are secured to the flange 46 by suitable nuts 48. The passages through the flange 18 provided for the bars 43 contain packing gaskets 49 held in place by glands 50. The sleeve 47 is designed to be moved longitudinally with reference to the hub 15 so as to cause the disk 41 to participate in such movement, and for this purpose the sleeve 47 is surrounded by a collar 51 confined between the annular flange 46 and another collar 52 secured to the sleeve 47 by set-screws 53. This collar 51 has annular ribs 54 formed at its ends, and the other collar 52 has an annular rib 55 coincident with the matching rib 54 on the corresponding end of the collar 51. The two ribs 54 and also the flange 46 and rib 55 are formed with ball races for the reception of anti-friction balls 56. The collar 51 is secured to a yoke 57, best shown in Fig. 3, from which extends an operating connection 58 to some convenient point (not shown) by means of which the collar 51 may be moved to and fro in the plane of the axis of the shaft 1. The yoke 57 has its ends made fast to the collar 51 at diametrically opposite points by suitable set-screws 59.

Returning, now, to the consideration of the ring 22 and parts coacting therewith, it will be seen from Fig. 1 and also from Fig. 4 that this ring has a portion of its inner periphery adjacent to the cheek plate 4 screw-threaded as indicated at 60. Threaded on to this screw-threaded portion of the ring 22 is an annulus 61 formed on its inner periphery with an annular series of gear teeth 62. This annulus 61 extends from the ring 22 diametrically inward for a distance sufficient to cover the outer edge of the vane-carrying drum, and the section 27 of this drum has an annular recess 63 to receive the annulus 61.

Extending through a suitable journal bearing formed in a boss 64 cast on the cheek plate 4 is a stud shaft 65 carrying at its inner end a pinion 66 meshing with the gear teeth 62 on the annulus 61. The shaft 65 is made with a tapered section 67 and this shaft is held in place by a bushing 68. The outer end of the shaft 65 is reduced where it passes through the bushing, and finally terminates in a hand wheel 69 by means of which it may be turned.

The vanes 32 bear at one of their edges against the inner wall of the cheek plate 21, while at their outer edges they are engaged by the annulus 61. These parts may be all turned true so that without undue friction practically fluid-tight joints are made at these points. As the parts wear the annulus 61 may be adjusted from time to time by turning the hand wheel 69, when the annulus, on being rotated, will be screwed toward the vanes and thus kept in close relation thereto. When the parts are suitably adjusted by means of the annulus 61 the bushing 68 may be screwed down tight, thus forcing the shaft 65 inward until its tapered section 67 is firmly seated, making a fluid-tight joint and at the same time locking the shaft against accidental rotation.

Adjacent to the corresponding end of the recess 25 there is a structure, best shown in Fig. 6. This structure consists of an inclined wall or abutment 70 terminating at one end in a cylindrical portion 71 seated in a cylindrical seat formed in the ring 22. The other end of the wall 70 is bent at an angle, as shown at 72, and suitably curved to rest snugly against the periphery of the vane drum. The abutment is also supplied with side walls 73 having their outer faces curved on the radius of the ring. One wall 73 abuts against the cheek plate 21, while the wall 70 is provided with a spring-retained follower 74, the springs being shown at 75 seated in the walls 70 and 72. This follower 74 permits the adjustment of the annulus 61 and still maintains a tight joint between the abutment member and said annulus.

Secured to the inner periphery of the ring 22 at the edge of the recess 25 remote from the abutment or wall 70 is the bridge piece 76 of a vane race composed of two curved spaced arms 77 formed in one piece with the bridge piece 76 and at the other end stepped, as indicated at 78, to engage the edge of the portion 72 of the valve. The bridge piece 76 may be recessed into the inner wall of the ring 22 and there held by a screw 79.

It will be observed that the inner faces of the arms or bars 77 constituting the vane race are arranged eccentrically to the axis of the shaft 1. Now, let it be assumed that the space between the periphery of the vane drum and the inner periphery of the ring 22 is filled with oil or other fluid, oil being preferred, then when the vanes are rotated this rotation is resisted by the oil with which the vanes are brought into contact. Suppose, now, that the vanes are permitted to make contact with the inner periphery of the ring 22 and that the parts are in about the position shown in Fig. 2. Also, that the shaft is rotating in the direction indicated by the arrow in Fig. 2, that is, it is rotating counter-clockwise as viewed in such figure. The two vanes corresponding in position to the four and ten o'clock positions of a clock face are in direct engagement with the inner wall of the ring 22 and the oil between these vanes and the wall 70 is subjected to compression stress, but, being for all practical purposes non-compressible and having no means of escape, this oil acts the same as though there were a solid connection between these two vanes and the two walls or abutments. The result of this is that the ring 22 must participate in the rotative movement of the vanes, and, consequently, the driven shaft 2 will be caused to rotate at the same speed as the drive shaft 1. Suppose, again, that there is a certain amount of leakage past these two vanes located at the four and ten o'clock positions, either because of the ill-fitting of the parts or because the disk 41 has been so adjusted that these two vanes, or, in fact, any of the vanes, will not become seated against the inner wall of the ring 22. The result of this leak will be that the shaft 1 will forge ahead of the shaft 2, slowly or quickly, depending upon the rapidity of leak past the two vanes considered, until these two vanes reach the vane race formed by the two arms 77. From this point onward the leak passage is largely augmented, while the next two vanes in order, namely, those shown in Fig. 2 as at the six and twelve o'clock positions, have been caused to ride up the inclined walls 70 until they have reached the outermost extent of their travel under the impulse of the springs 34. Now this second pair of vanes receive the stress of the work and move forward slowly or quickly, as the case may be, toward the vane race. In the meantime the first two vanes, which may now be considered to have reached the point shown in Fig. 2 as that corresponding to the two and eight o'clock positions, are being forced into their seats by the vane race arms 77 because of the eccentric position of these arms. As the relative rotation of the vane drum progresses the first considered pair of vanes will ultimately reach the six and twelve o'clock positions and will then be, for the time being, out of action, to again come into active operation as soon as they have progressed far enough to pass up the inclined walls 70 of the valves.

In the foregoing description the continued rotation of the ring 22 has not been taken into account and the operation has been described as though this ring remained still in space, but it will be remembered that while these various operations have been taking place the resistance of the oil in its passage around the vanes has reacted upon the ring to cause its rotation, and the speed of rotation of this ring will depend upon the throttling effect of the vanes upon the passage of the oil. When the vanes are fully withdrawn into their seats the rotation of the ring 22 and of the shaft 2 connected therewith, is zero, while the projection of the vanes radially outward from their seats may be so regulated as to cause an accelerated rotation of the shaft 2 from the zero position up to the same speed as the shaft 1.

In order to utilize the pressure within the oil chamber and to compensate for variations therein, there is secured exterior to the cheek plate 21 a cylinder 80 screwed into a collar 81 provided with a nipple 82 which, in turn, is screwed into the cheek plate 21 and is put into communication with the oil chamber through a duct 83, indicated in dotted lines in Fig. 1. The collar 80 is provided with an interior flange 84 between which and the end of the cylinder 80 is clamped one end of a flexible container 85, the other end of which is closed and has secured to it a weight 86. The end of the collar 81 remote from that to which the cylinder 80 is connected is closed by a screw-plug 87. Oil is introduced into the flexible container 85, which may be made of leather or other suitable material, after which the plug 87 is screwed down tight into place. Now, on the rotation of the structure in the direction of the arrow, the tendency of the weight 86 is to collapse the flexible structure and force the oil therein into the oil chamber between the cheek plates. If, however, the pressure in this oil chamber becomes sufficiently great, oil will flow backward into the container 85 and the pressure will thereby be relieved to that extent, but if the pressure within the oil chamber is reduced, then the centrifugal force acting upon the weight 86 will cause the oil to flow again into the chamber. There is thus provided an equalizing means by which the normal pressure of the oil is maintained sensibly constant and shocks or jars are avoided, and the structure also provides an elastic means by which the harmful effects of overloads are avoided.

It is desirable that the connection of the relief mechanism be as near a neutral point as possible, and, therefore, it should be placed adjacent to one of the valves.

While I have used oil as an example of the fluid medium employed in the power transmission device, it is to be understood that water or glycerin or any other suitable fluid may be used with like effect.

I claim:—

1. A power transmission device comprising a drive member, a vane drum fast thereon, radial seats formed in the drum, vanes in said seats, springs housed in said seats and tending to force the vanes outwardly, and connections between the vanes, and a common actuating member for said connections.

2. A power transmission device comprising a drive member, a vane drum fast thereon, radial seats formed in said drum, vanes in said seats, springs housed in said seats and acting on the vanes to drive them outwardly, and flexible connections fast to the vanes and passing through the seats, and an actuating member for the flexible connections common to all of them.

3. A power transmission device comprising a drive shaft, a driven shaft, a fluid-container on the driven shaft, a vane carrier on the drive shaft, radially-movable vanes on said carrier, springs tending to force the vanes radially outward, flexible connections engaging said vanes to move them radially inward, means for diverting the course of the flexible connections to a direction parallel to the drive shaft, and a common actuating means for all the flexible connections movable in the direction of the length of the drive shaft.

4. A power transmission device comprising a drive shaft, a driven shaft, a fluid-container carried by said driven shaft, radially-movable vanes carried upon the drive shaft, and adjusting means movable laterally into engagement with the sides of the vanes for taking up side wear of said vanes.

5. A power transmission device comprising a drive shaft, a driven shaft, a fluid-container carried by said driven shaft, radially-movable vanes carried upon the drive shaft, and adjusting means for taking up side wear of the vanes, comprising an annulus provided with exterior screw-threads engaging other screw-threads on the fluid-container and provided with gear teeth on its inner periphery, a pinion, and means for operating the same, said pinion engaging the gear teeth on the annulus for turning it to move against the corresponding edges of the vanes.

6. A power transmission device comprising a drive shaft having taper portions, a driven shaft, a fluid-container on the driven shaft, radial vanes on the drive shaft, and taper bearings between the drive shaft and the fluid-container carried by the driven shaft, said bearings being adjustable in a direction to coact with the taper of the drive shaft.

7. A power transmission device comprising a drive shaft, a driven shaft, a fluid-container on the driven shaft, vanes carried by the drive shaft, and a yielding relief chamber connected to the fluid-container and comprising a rigid receptacle, a flexible receptacle therein, and a weight acted upon by centrifugal force for collapsing the flexible receptacle.

8. A power transmission device comprising a drive shaft, a driven shaft, a cylindrical fluid-container carried by the driven shaft, radially-movable vanes carried by the drive shaft, eccentric vane races in the container tending to move the vanes radially inward, and abutments arranged on the interior of the fluid-container at the points of least internal diameter thereof and coincident with the inner ends of the eccentric races.

In testimony that I claim the foregoing as my own, I have hereto affixed my signature in the presence of two witnesses.

CARL A. SCHLACHTER.

Witnesses:
E. C. STEVENSON,
NANCY L. STEVENSON.